US 8,823,833 B2

(12) United States Patent
Koshikawa et al.

(10) Patent No.: US 8,823,833 B2
(45) Date of Patent: Sep. 2, 2014

(54) IMAGER THAT ADDS VISUAL EFFECTS TO AN IMAGE AND RECORDS VISUAL EFFECTS INFORMATION IN AN IMAGE FILE

(75) Inventors: Naoki Koshikawa, Saitama (JP); Teppei Okamoto, Saitama (JP); Koichi Ishibashi, Tokyo (JP)

(73) Assignee: PENTAX Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 12/779,263

(22) Filed: May 13, 2010

(65) Prior Publication Data

US 2010/0289925 A1 Nov. 18, 2010

(30) Foreign Application Priority Data

May 14, 2009 (JP) .................................. 2009-117748

(51) Int. Cl.
*H04N 5/262* (2006.01)
*H04N 5/77* (2006.01)
*H04N 9/82* (2006.01)

(52) U.S. Cl.
CPC .................................. *H04N 5/772* (2013.01); *H04N 9/8205* (2013.01)
USPC .................... 348/239; 348/231.3; 348/333.02

(58) Field of Classification Search
CPC .......... H04N 1/32128; H04N 5/23229; H04N 5/2621; H04N 2201/3205; H04N 2201/3242; H04N 2201/3277
USPC .................................. 348/239, 231.3, 333.02
See application file for complete search history.

(56) References Cited

U.S. PATENT DOCUMENTS

2002/0093633 A1 * 7/2002 Milch .............................. 355/40
2004/0178955 A1 * 9/2004 Menache et al. .............. 342/463
2005/0246643 A1 * 11/2005 Gusmorino et al. .......... 715/734
(Continued)

FOREIGN PATENT DOCUMENTS

| JP | 2000-182044 | 6/2000 |
| JP | 2004-64297 | 2/2004 |
| JP | 2007-221723 | 8/2007 |
| JP | 2008-60886 | 3/2008 |

OTHER PUBLICATIONS

Naoki Koshikawa et al., "Imager That Adds Visual Effects to an Image", U.S. Appl. No. 12/779,247, filed May 2010.
(Continued)

*Primary Examiner* — Usman Khan
(74) *Attorney, Agent, or Firm* — Greenblum & Bernstein P.L.C.

(57) ABSTRACT

An imager is provided having an imaging sensor, an image processor, and a recorder. The imaging sensor creates an image signal by photographing a subject. The image processor processes the image signal with visual effects processing so as to create image data, and adds metadata to the image data so as to create an image file. The metadata contains post-processing information includes information based on the visual effects process. The recorder stores the image file. The visual effects process is used in processing the image data. The image processor conducting a post process in which more than one visual effects process is carried out, a new image file is created, and the new image file is stored in the recorder. The post-processing information has a post-processing counter and pre-processing information. The post-processing counter indicates the number of times the post process is carried out. The pre-processing information represents the state of a preprocessed image file prior to post processing.

11 Claims, 6 Drawing Sheets

(56) References Cited

U.S. PATENT DOCUMENTS

| | | | |
|---|---|---|---|
| 2006/0088228 A1* | 4/2006 | Marriott et al. | 382/305 |
| 2006/0190506 A1* | 8/2006 | Rao et al. | 707/204 |
| 2006/0279645 A1* | 12/2006 | Ishibashi et al. | 348/231.99 |
| 2007/0036444 A1* | 2/2007 | Yoshida | 382/232 |
| 2008/0297643 A1* | 12/2008 | Ono | 348/335 |
| 2009/0102942 A1* | 4/2009 | Yoshizumi et al. | 348/222.1 |
| 2009/0268041 A1* | 10/2009 | Chou et al. | 348/208.6 |
| 2010/0289924 A1* | 11/2010 | Koshikawa et al. | 348/239 |

OTHER PUBLICATIONS

Japanese Office Action dated Apr. 30, 3013 (English Translation).
Japan Office Action, mail date is Apr. 30, 2013.

* cited by examiner

FIG.4

| NAME OF FIRST DIGITAL FILTER | |
|---|---|
| PARAMETER 1-(1) | PARAMETER VALUE 1-(1) |
| PARAMETER 1-(2) | PARAMETER VALUE 1-(2) |
| PARAMETER 1-(3) | PARAMETER VALUE 1-(3) |
| . . . | . . . |
| NAME OF SECOND DIGITAL FILTER | |
| PARAMETER 2-(1) | PARAMETER VALUE 2-(1) |
| PARAMETER 2-(2) | PARAMETER VALUE 2-(2) |
| PARAMETER 2-(3) | PARAMETER VALUE 2-(3) |
| . . . | . . . |
| . . . | |

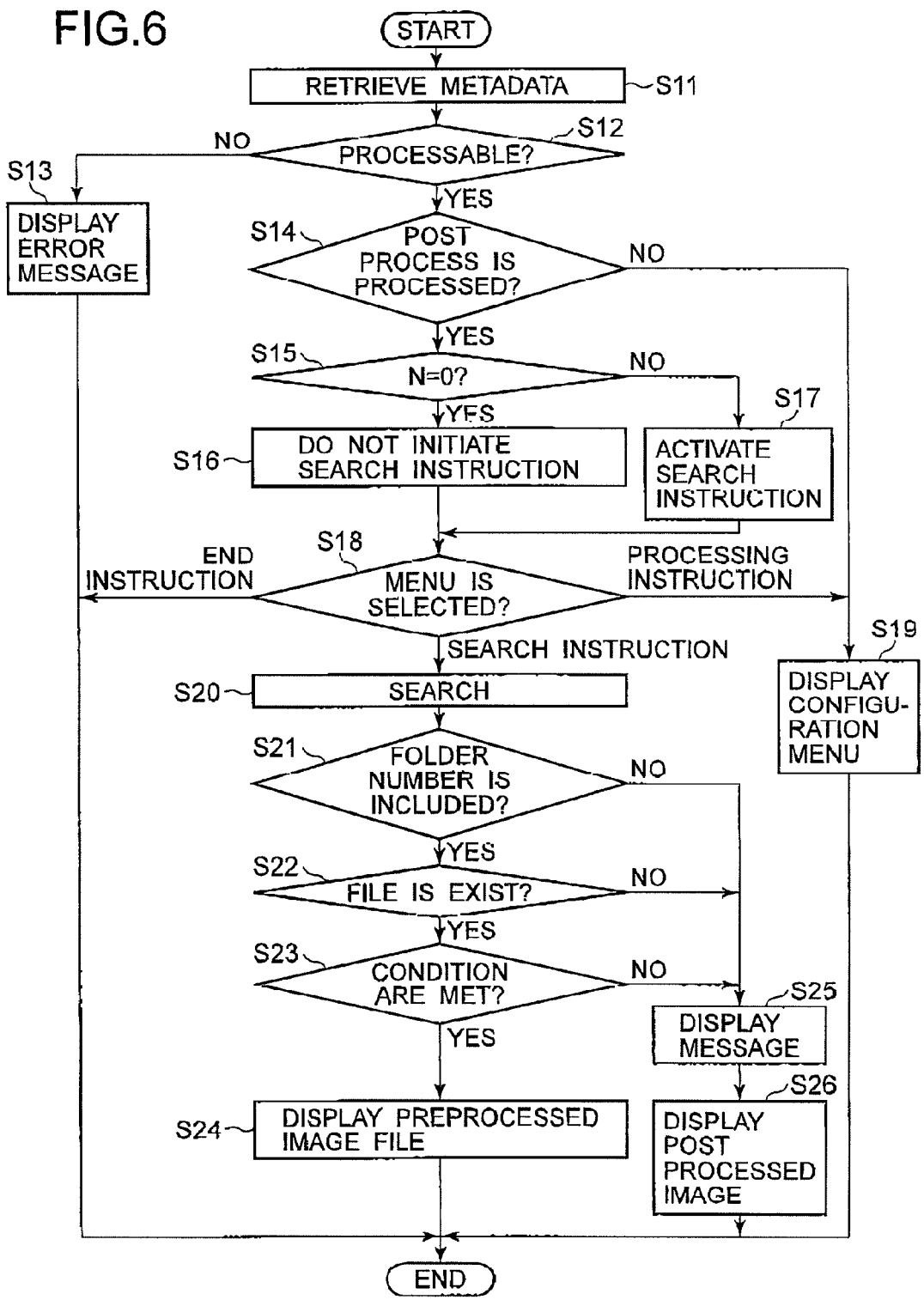

`US 8,823,833 B2`

IMAGER THAT ADDS VISUAL EFFECTS TO AN IMAGE AND RECORDS VISUAL EFFECTS INFORMATION IN AN IMAGE FILE

BACKGROUND OF THE INVENTION

1. Field of the Invention

The present invention relates to an imager that stores image files and searches for a particular image file from the stored image files.

2. Description of the Related Art

Japanese unexamined Patent Publication Number 2000-182044 discloses an imager that adds visual effects to a photographed image. A visual effect is added by a digital filter, for example. A photographed image that has been enhanced with one or more visual effects is represented on a display provided in the imager. However, when an imager stores many images, it is difficult for a user to find a preprocessed image.

SUMMARY OF THE INVENTION

An object of the present invention is to provide an imager that searches for a preprocessed image.

An imager is provided having an imaging sensor, an image processor, and a recorder. The imaging sensor creates an image signal by photographing a subject. The image processor processes the image signal with visual effects processing so as to create image data, and adds metadata to the image data so as to create an image file. The metadata contains post-processing information includes information based on the visual effects process. The recorder stores the image file. The visual effects process is used in processing the image data. The image processor conducting a post process in which more than one visual effects process is carried out, a new image file is created, and the new image file is stored in the recorder. The post-processing information has a post-processing counter and pre-processing information. The post-processing counter indicates the number of times the post process is carried out. The pre-processing information represents the state of a preprocessed image file prior to post processing.

BRIEF DESCRIPTION OF THE DRAWINGS

The objects and advantages of the present invention will be better understood from the following description, with references to the accompanying drawings in which:

FIG. 4 shows the file structure of an image file in which post-processing information is recorded;

FIG. 6 is a flowchart of a search process that finds a preprocessed image file.

DESCRIPTION OF THE PREFERRED EMBODIMENTS

Figure 1:
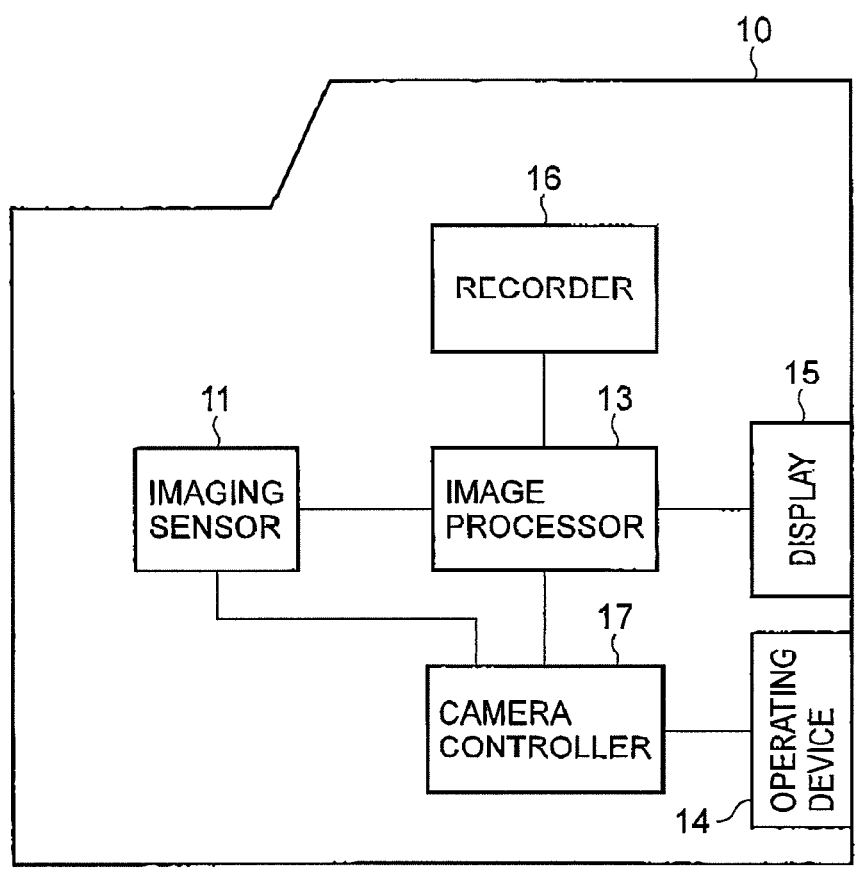
FIG. 1 is a block diagram of an imager according to the embodiment of the present invention.

The present invention is described below with references to the embodiment shown in the drawings. FIG. 1 shows the imager according to this embodiment is a digital camera 10 equipped with an imaging sensor 11, an image processor 13, an operating device 14, a display 15, a recorder 16, and a camera controller 17.

Light reflected from a subject enters through a lens (not shown), and is captured by the imaging sensor 11, which then outputs an image signal to the image processor 13. The image processor 13 creates image data by processing the image signal, and then sends the image data to the display 15. The display produces a visual image according to the image data. The image processor 13 creates an image file from the image data, and then sends the image file to the recorder 16, which is a recording medium in which image files are stored. The camera controller 17 controls each process carried out by the image processor 13 of the digital camera 10.

When a user performs a first operation with the operating device 14, the image processor 13 processes the image data with a digital filter and sends the processed image data, i.e. the image file, to the recorder 16. The recorder 16 stores the image file. The image data to be processed is created immediately after photographing, or retrieved from storage in the recorder 16. The digital filter is used to add visual effects to the image data, and includes, for example, a monochrome filter, a sepia filter, a color filter, or a fish-eye filter. The processing involving the digital filter is a visual effects process.

Figure 2:
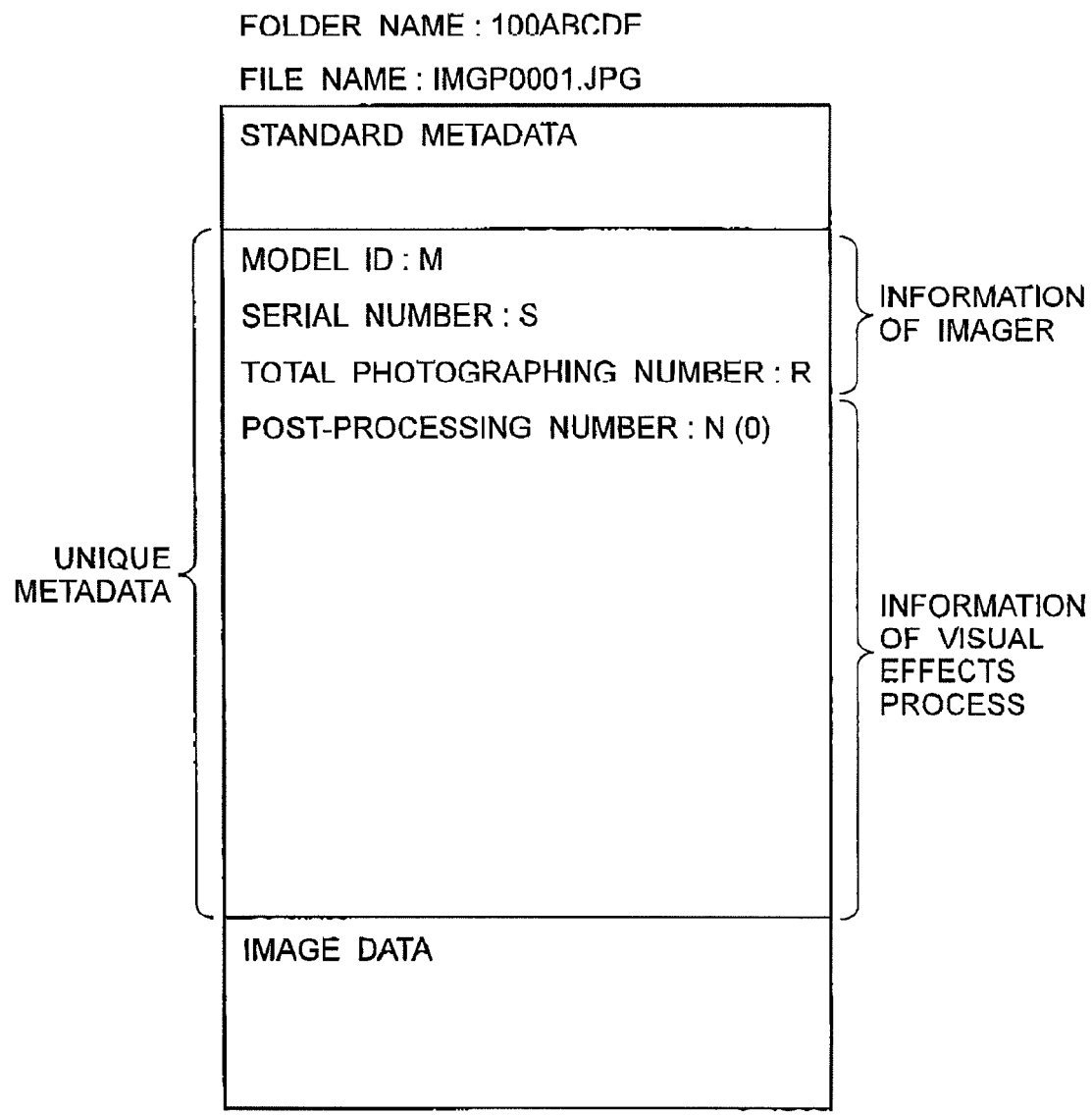
FIG. 2 shows a file structure before visual effects are added to an image file.

The image file stored in the recorder 16 is described hereinafter. In the case that the visual effects process is not carried out, the image processor writes both standard metadata and unique metadata to the image file (FIG. 2). The standard metadata includes the photographing date, shutter speed, aperture value (F number), ISO value, etc, according to the exchangeable image file format (Exif). The unique metadata includes the model ID (M), serial number (S), total photographing number (R), and post-processing number (N). The model ID (M) consists of characters assigned for each different model. The serial number (S) is assigned for each manufactured device.

The total photographing number (R) reflects the cumulative quantity of photographing, and is integrated from the time of shipping.

The post process comprises a first process and a second process. In the first process, the image processor 13 carries out the visual effects process one or more times immediately after photographing, and then the recorder 16 stores the image file created according to the visual effects process. In the second process the image processor 13 retrieves the image file from the recorder 16, carries out the visual effects process one or more times, and then the recorder 16 stores the image file created according to the visual effects process.

The post-processing number (N) is the number of times the second process is conducted, and is integrated for each image file from the moment of creation. The initial value of the post-processing number (N) is zero. That is, the post-processing number of an image file created immediately after photographing is zero. The post-processing number (N) is increased incrementally by one every time the second process is carried out.

Figure 3:
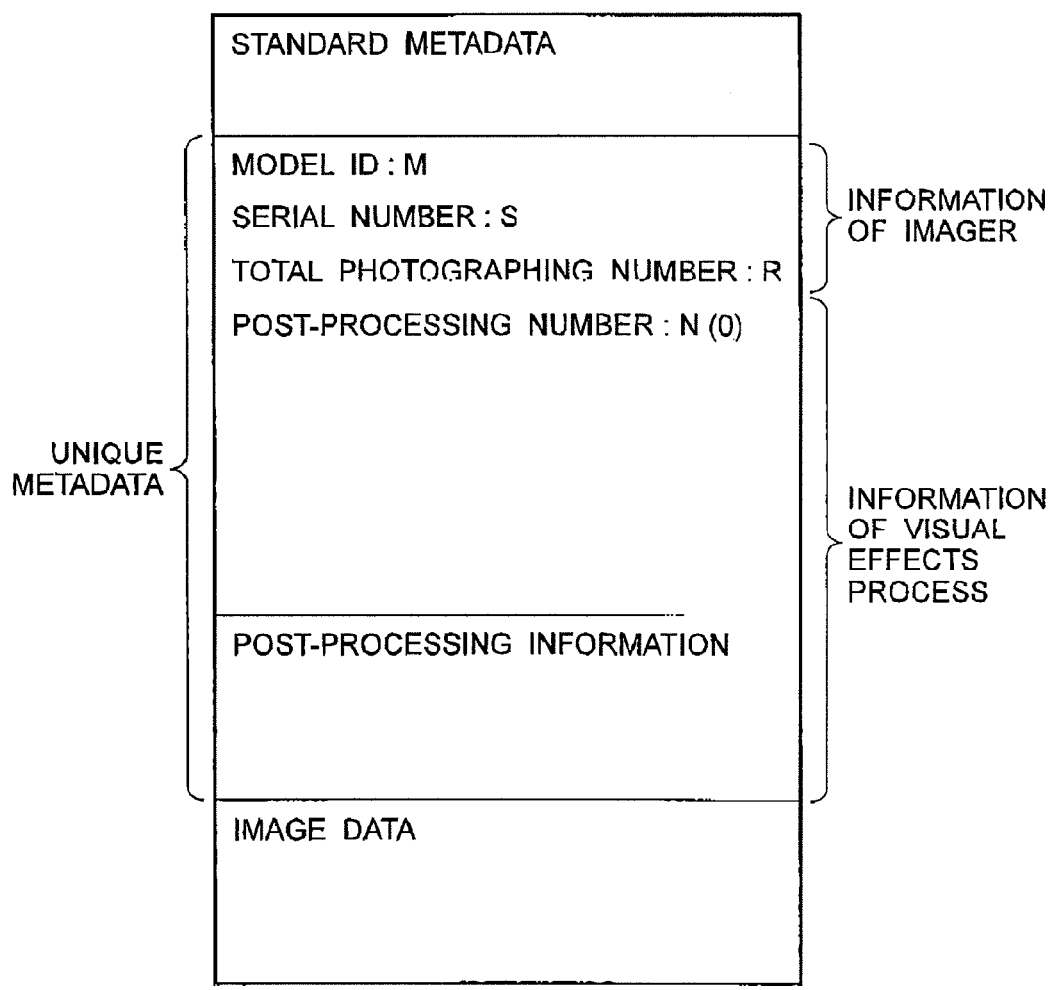
FIG. 3 shows the file structure of an image file to which visual effects are added immediately after photographing.

During the first process, the image processor 13 adds standard metadata, unique metadata, and post-processing information to the image file (FIG. 3). The recorder 15 then stores the processed image file. In the first process, the unique metadata includes the model ID (M), the serial number (S), the total photographing number (R), and the post-processing number (N).

The post-processing information is based on the visual effects, and includes the name of the digital filter, parameters of the digital filter, and values of the parameters (FIG. 4). In the case that multiple digital filters are applied to the image data, the post-processing information is added to the image file in the same order that the digital filters were applied.

A soft filter is a particular digital filter that applies softening effects to an image. Post-processing information related to the soft filter is described hereinafter. The name of the digital filter is "soft". The parameters of the digital filter are "level of soft focus" and "softness of shadow". The values of the parameter corresponding to the level of soft focus are designated by numerals and indicate the degree of soft focus. The values of the parameter corresponding to the softness of shadow consist of either "1" or "0", and indicate existence or nonexistence of soft focus.

A retro filter is another digital filter, which applies retro effects to an image to make it appear older than it actually is. The post-processing information of the retro filter is described hereinafter. The name of the digital filter is "retro". The parameters of the digital filter are "color tone" and "edge of subjects". The values of the parameter corresponding to the color tone are designated by numerals. The values of the parameter corresponding to the edge of subjects are also designated by numerals and indicate the level and or existence of enhancement of the edge of a subject.

Figure 5:
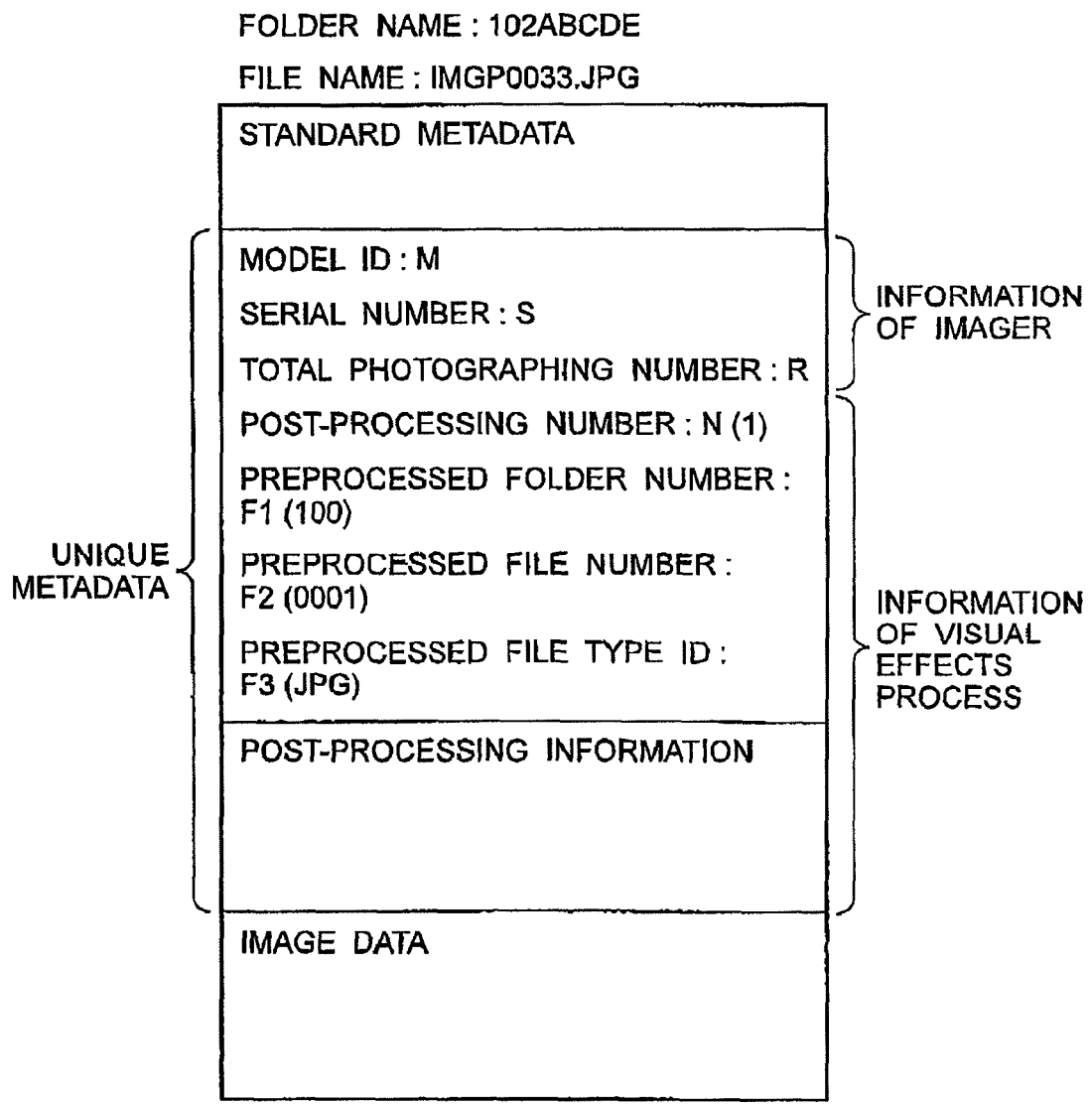
FIG. 5 shows the file structure of an image file in which visual effects were added immediately after the file was retrieved from a recorder.

In the case that first the soft filter followed by the retro filter are applied to the image data, the first post-processing information includes the name of the first digital filter "soft", the first parameter of the first digital filter "level of soft focus", the second parameter of the first digital filter "softness of shadow", the value of the first parameter corresponding to "level of soft focus", and the value of the second parameter corresponding to "existence or nonexistence of soft focus". The second post-processing information includes the name of the second digital filter "retro", the first parameter of the second digital filter "color tone", the second parameter of the second digital filter "edge of subjects", the value of the first parameter corresponding to "color tone", and the value of the second parameter corresponding to "edge of subjects". During the second process, the image processor 13 adds standard metadata, unique metadata, and post-processing information to the image file (FIG. 5). Then, the recorder 15 stores the enhanced image file. In the second process, the unique metadata includes the model ID (M), the serial number (S), the total photographing number (R), the post-processing number (N), image file information created prior to the second process, and the post-processing information. The image file prior to undergoing the second process is a preprocessed image file.

The preprocessed image file is retrieved from the recorder 16 for visual effects processing, and it includes image data prior to undergoing the latest second process. The preprocessed image file information includes its folder number (F1), file number (F2) and file type ID (F3). The construction of folders and files is based on the DCF (Design rule for Camera File system). Therefore, the names of folders and files are identified if the folder number (F1) or the file number (F2) includes at least part of the names of folders or files. The file type ID (F3) indicates the file format. For example, in the case that "JPG" is stored in the file type ID (F3), the file format is jpeg. In the case that the preprocessed image file has the file name "IMG0001.JPG" and is stored in the folder "100ABCDE" as illustrated in FIG. 2, it is processed one time under the second process and an image file is created (FIG. 5). In the image file illustrated in FIG. 5, the model ID (M), the serial number (S), and the total photographing number (R) do not change, i.e. these values are the same as they were in the preprocessed image file. Otherwise, the post-processing number (N) is set to one, the folder number (F1) is set to 100, the file number (F2) is set to "0001" and the file type (F3) is set to "JPG". The image file illustrated in FIG. 5 has the standard metadata, the unique metadata and the image data. The unique metadata includes the model ID (M), the serial number (S), the total photographing number (R), the post-processing number (N), the folder number (F1), the file number (F2), the file type (F3) and the post-processing information.

In this embodiment, unique metadata is used to search for a preprocessed image file. The preprocessed image file has image data that has not undergone post processing.

In the case that a user manipulates the operating device 14 for a certain method (the second operation) while an image that has already undergone a post-processing operation (the first and second processes) is represented on the display 15, the image processor 13 searches for a preprocessed image file corresponding to the represented image from files stored in the recorder 16 (Step S20 of FIG. 6). The image processor 14 conducts a search based on the unique metadata of an image file of the represented image for a preprocessed image file that is stored in a folder that corresponds to the folder number "F1" and has a filename that corresponds to the file number "F2", file type that corresponds to the file type ID "F3", the same model ID "M", the same serial number "S", the same total photographing number "R", and a post-processing counter "N" that is one less than the post-processing counter of the files stored in the recorder 16. When it finds such a preprocessed image file, it is presented on the display 15.

The search process is described with reference to FIG. 6. The search process starts when a user manipulates the operating device 14 to indicate both an image file stored in the recorder 16 and a digital filter selection menu on the display 15. In Step S11, the image processor 13 retrieves the standard metadata and unique metadata recorded in the image file represented on the display 15.

In Step S12, the image processor 13 determines whether the image file of the represented image can be processed with the visual effects process based on the standard metadata and the unique metadata. Files that cannot to be processed with the visual effects process are not considered as targets of visual effect processing, for example image and movie files that are captured by another model. In the case that an image file cannot undergo visual effects processing, the recurrence process continues to Step S13. Otherwise, the process proceeds to Step S14 when the image file can undergo visual effects processing.

In Step S13, the image processor 13 shows a message indicating that the image file for the image appearing on the display 15 cannot undergo visual effects processing. After that, the recurrence process ends.

In Step S14, the image processor 13 determines whether the image data of the represented image has undergone post processing based on the retrieved unique metadata. More precisely, the image processor 13 determines whether the unique metadata includes the post-processing information. In the case that the post-processing information is included, the image processor 13 determines that the image data has undergone post processing and the recurrence process continues to Step S15. In the case that the post-processing information is not included, the image processor 13 determines that the image data has not undergone post processing and the process proceeds to Step S19.

In Step S15, the image processor determines whether or not the post-processing counter "N" of the displayed image is zero based on the retrieved unique metadata. Hereinafter, an image file that corresponds to the displayed image file is called a post-processed image file. In the case that the post-processing counter "N" is zero, the image file is determined by carrying out the first process but not the second process, and the process then proceeds to Step S16. Otherwise, the image file is determined by carrying out the second process at least one time, and the process then proceeds to Step S17.

In the case that the post-processing counter "N" is zero, a preprocessed image file does not exist. Therefore, the image processor 13 does not initiate any search instructions for a preprocessed image file in Step S16.

In the case that the post-processing counter "N" is not zero, a preprocessed image file may exists. Therefore, the image processor 13 activates search instruction in Step S17.

In Step S18, the image processor 13 presents a selection menu on the display 15.

The selection menu has first to third items. In the case a user selects the first item by manipulating the operating device 14, the image processor 13 ends the recurrence process. In the case a user selects the second item by lining the operating device 14, the process continues to Step S19 and the visual effects process is repeated. In the case a user selects the third item, i.e. the second operation, by using the operating device 14, the process proceeds to Step S20 and the preprocessed image file is reproduced. However, in the case that the image processor 13 does not initiate search instructions in Step S16, the image processor 13 disables the selection of the item for searching for a preprocessed image file.

In Step S19, the image processor 13 presents a configuration menu on the display 15. A user configures the visual effects process by inputting the name of a digital filter, a parameter of the digital filter, and a value of the parameter into the configuration menu. This operation conducted by the user is the first operation.

The image processor 13 carries out the second process based on the configured visual effects process, and the processed image file is created. The processed image file, which is stored in the recorder 16, contains both the post-processing information and the image data processed during the second process. After that, the image based on the processed image file is represented on the display 15 and the search process ends.

In Step S20, the image processor 13 starts searching for a preprocessed image file of a post-processed image file among the files stored in the recorder 16. The search proceeds from Step S20 to Step S23.

In Step S21, the image processor 13 determines whether or not a folder corresponding to the folder number "F1", which is included in the unique metadata of a preprocessed image file, exists in the metadata of the files stored in the recorder 16. If such a folder exists in the metadata the process proceeds to Step S22, otherwise, the process jumps to Step S25.

In Step S22, the image processor 13 determines whether or not the folder corresponding to the file number "F2" exists in the folder corresponding to such folder number "F1". If such a folder exists in the metadata, the process continues to Step S23, otherwise, the process proceeds to step S25.

In Step S23, the image processor 13 determines whether or not the type of file determined in Step S22 corresponds to a file type "F3" that is included in the unique metadata of a past-processed image file, and whether the model ID "M", serial number "S", and total photographing number "R" included in the unique metadata of the file determined in Step S22 are the same as those of a post-processed image file, and whether or not the total photographing number "R" included in the unique metadata of the file determined in Step S22 is the same as that of a post-processed image file whose post-processing counter "N" is one less than that of a post-processed image file. In the case that such a condition is satisfied, the process continues to Step S24, otherwise, it proceeds to Step S25.

In Step S24, the image processor 13 determines that a preprocessed image file satisfies the conditions of Steps S21-S23, and displays it on the display 15. Then, the search ends.

In Step S25, the image processor 13 displays a message on the display 15 that an image file satisfying the conditions of Steps S21-S23 does not exist. Afterward, the display 15 displays an image of a post-processed image file and the search ends.

When there are many image files stored in the recorder, it is difficult to find a preprocessed image file. However, according to the embodiment the correct preprocessed image file can be found quickly and with ease. Moreover, the search goes back to the image file obtained immediately after photographing in the first process.

Note that, the image processor 16 provided in the imager 10 searches for a preprocessed image file, however, a personal computer may also search for a preprocessed image file using the same process.

The image file includes the post-processing information that the image processor can refer to in order to determine how visual effects were applied. The total photographing number cannot be tampered with by a user; therefore, the image processor can find the correct preprocessed image file.

The image processor may search for an image file that has a post-processing counter value of zero. In this case, the image processor conducts a search for an image file prior to the post process.

Note that the visual effect may be either a resizing or trimming effect. The resizing effect changes the size of an image. The trimming effect clips the outer portion of the image.

Although the embodiment of the present invention has been described herein with references to the accompanying drawings, obviously many modifications and changes may be made by those skilled in the art without departing from the scope of the invention.

The present disclosure relates to subject matter contained in Japanese Patent Application No. 2009-117748 (filed on May 14, 2009), which is expressly incorporated herein, by reference, in its entirety.

The invention claimed is:

1. An imager comprising:
   an imaging sensor that creates an image signal by photographing a subject;
   an image processor that processes the image signal with visual effects process so as to create image data, and adds metadata to the image data so as to create an image file, the metadata containing post-processing information that includes information based on the visual effects process, including parameters of the visual effects process; and
   a recorder that stores the image file;
   the visual effects process being used in processing the image data;
   said image processor conducting a post process in which more than one visual effects process is carried out, a new image file is created based on the visual effects process, and the new image file is stored in said recorder;
   the post-processing information having, a post-processing counter and pre-processing information, the post-processing, counter indicating the number of times the post process is carried out, the post processing information being added to the image file after the post process, comprising more than one visual effects process, is carried out in a same order as the more than one visual effects process is carried out and the pre-processing, information representing a state of a preprocessed image file prior to post processing;

wherein the state of the preprocessed image file prior to post processing, is a location of the preprocessed image file.

2. The imager according to claim 1, wherein the post-processing information includes information based on the post process.

3. The imager according to claim 1, wherein said image processor conducts a search for the preprocessed image file before the post process based on metadata that is included in the image file.

4. The imager according to claim 1, wherein the metadata includes information concerning the model, serial number, and total photographing number of said imager.

5. The imager according to claim 1, wherein the visual effects process has at least one of either a digital, resizing or trimming filter.

6. The imager according to claim 1, wherein the image processor, prior to post processing, searches for the preprocessed image file among the image files stored in the recorder based on the post-processing information.

7. An image producer comprising:
an image processor that processes an image signal with visual effects process so as to create image data, and adds metadata to the image data so as to create an image file, the metadata containing post-processing information that includes information based on the visual effects process, including parameters of the visual effects process;
the visual effects process being used in processing the image data;
said image processor conducting a post process in which more than one visual effects process is carried out, a new image file is created based on the visual effects process;
the post-processing information having a post-processing counter and pre-processing information, the post-processing counter indicating the number of times the post process is carried out, the post processing information being added to the image file after the post process, comprising more than one visual effects process, is carried out in a same order as the more than one visual effects process is carried out and the pre-processing information representing a state of a preprocessed image file prior to post processing;

wherein the state of the preprocessed image file prior to post processing, is a location of the preprocessed image file.

8. The image producer according to claim 7, wherein the state of the preprocessed image file prior to post processing, contains at least one of a folder number, a file number, and a file type, of the preprocessed image file.

9. The image producer according to claim 7, wherein the image processor, prior to post processing, searches for the preprocessed image file among the image files stored in the recorder based on the post-processing information.

10. An imager comprising:
an imaging sensor that creates an image signal by photographing a subject;
an image processor that processes the image signal with visual effects process so as to create image data, and adds metadata to the image data so as to create an image file, the metadata containing post-processing information that includes information based on the visual effects process, including parameters of the visual effects process; and
a recorder that stores the image file, the visual effects process being used in processing the image data;
said image processor conducting a post process in which more than one visual effects process is carried out, a new image file is created based on the visual effects process, and the new image file is stored in said recorder;
the post-processing information having a post-processing counter and pre-processing information, the post-processing counter indicating the number of times the post process is carried out, the post processing information being added to the image file after the post process, comprising more than one visual effects process is carried out in a same order as the more than one visual effects process is carried out and the pre-processing information representing a state of a preprocessed image file prior to post processing;
wherein the state of the preprocessed image file prior to post processing, contains at least one of a folder number, a file number, and a file type, of the preprocessed image file.

11. The imager according to claim 10, wherein the image processor, prior to post processing, searches for the preprocessed image file among the image files stored in the recorder based on the post-processing information.

* * * * *